United States Patent
Richards

[19]

[11] Patent Number: 6,118,190
[45] Date of Patent: Sep. 12, 2000

[54] FAIL-SAFE SYSTEM

[75] Inventor: Paul N. Richards, Basingstoke, United Kingdom

[73] Assignee: Solartron Group Limited, Farnborough, United Kingdom

[21] Appl. No.: 09/105,216

[22] Filed: Jun. 26, 1998

[30] Foreign Application Priority Data

Jun. 27, 1997 [GB] United Kingdom ............... 9713678

[51] Int. Cl.$^7$ ..................................... H01H 47/00
[52] U.S. Cl. ........................................ 307/125; 307/127
[58] Field of Search ................................. 307/125, 116, 307/118, 115, 126, 127, 130; 324/521, 522, 76.77; 327/2, 218

[56] References Cited

U.S. PATENT DOCUMENTS

| 4,001,654 | 1/1977 | Davis et al. ............................ 317/135 |
| 4,467,386 | 8/1984 | Wasson . |
| 5,438,323 | 8/1995 | Shea . |

FOREIGN PATENT DOCUMENTS

| 0 216 361 | 4/1987 | European Pat. Off. . |
| 0 627 615 | 12/1994 | European Pat. Off. . |
| 1056032 | 1/1967 | United Kingdom . |
| 1438271 | 6/1976 | United Kingdom . |
| 1546587 | 5/1979 | United Kingdom . |
| 1603934 | 12/1981 | United Kingdom . |
| 1605145 | 2/1982 | United Kingdom . |
| 2083225 | 3/1982 | United Kingdom . |
| 2 232 836 | 12/1990 | United Kingdom . |
| 2236388 | 4/1991 | United Kingdom . |
| 2 279 749 | 1/1995 | United Kingdom . |
| 2 290 141 | 12/1995 | United Kingdom . |
| WO 86/05836 | 10/1986 | WIPO . |

*Primary Examiner*—Josie Ballato
*Assistant Examiner*—Robert L. DeBeradinis
*Attorney, Agent, or Firm*—Nixon & Vanderhye P.C.

[57] ABSTRACT

A circuit for controlling a fail-safe operation of measurement and control apparatus for detecting the presence or absence of water by making a measurement of the impedance experienced in a gap between an insulated tip of the electrode and a surface held at a reference voltage or else connected to ground. The apparatus may be configured to provide an alarm when water is present and should not be, or vice versa. The circuit comprises comparators IC1 and IC2, a phase detector IC3 and a triple-redundant drive circuit 12 which drives a relay 14. The function of IC1 is to ensure that when operating with water as the normal condition, an electrode fault, such as could be caused by excessive contamination, will cause the system output to indicate an abnormal condition. The main function of IC2 is to discriminate between the water condition and the steam condition. The function of IC3 is to ensure that there is no output if there exists an abnormal condition or any fault condition. It follows that there will only be an output if the sensor is in the normal condition. This is then shown to operate a relay using a secure triple redundancy drive circuit so that the relay contacts may be used to indicate a normal or an abnormal/fault condition.

21 Claims, 2 Drawing Sheets

FAIL-SAFE SYSTEM

BACKGROUND OF THE INVENTION

1. Field of the Invention

The present invention relates to a fail-safe system and is concerned particularly, although not exclusively, with a fail-safe system for use in measurement and control apparatus incorporating level detection apparatus.

2. Discussion of Prior Art

Fail-safe systems are used in measurement and control apparatus such as is used, for example, in a steam raising plant, where the level of water in a steam generation vessel is of critical importance. Level detection apparatus comprising a number of sensors immersed in water or steam is employed to monitor the water level. An example such level detection apparatus is described in our United Kingdom Patent No 1056032 in the name of Central Electricity Generating Board. Known fail-safe systems typically aim to output a fail-safe condition if there occurs a failure in the sensing circuit or else, for example, a loss of power. Such fail-safe systems are often extended so that a fail-safe output also results in the event of failure of a key specified component.

A drawback with the known fail-safe systems is that the failure of a component other than that which is specified will not be detected and will not automatically lead to a fail-safe output from the system.

SUMMARY OF THE INVENTION

According to one aspect of the present invention there is provided a fail-safe system for use with a sensor, the system comprising an electrical circuit for providing an output signal in accordance with a condition sensed by the sensor, the circuit comprising:

means for providing to the sensor an alternating electrical signal which signal is attenuated in accordance with a condition sensed by the sensor, an error detection device arranged to receive the attenuated signal and for causing an output of the circuit to go to a fail-safe condition if the error detection device detects an open circuit or short circuit at the sensor, first comparing means arranged to receive the attenuated signal and compare a value of the attenuated signal with a reference value, for causing the output of the circuit to go to a fail-safe condition if the value of the attenuated signal is indicative of an abnormal condition at the sensor, selecting means for selecting, between a plurality of alternatives, the nature of the abnormal condition determined by the first comparing means, and second comparing means arranged to receive the output from the first comparing means and the electrical signal provided to the sensor, and for causing the output of the circuit to go to a fail-safe condition if the result of the comparison is indicative of a fault.

The output of the circuit may be arranged to drive a control device which, has a normal condition and a failsafe condition such that the condition adopted by the control device is determined by the output of the circuit.

In a preferred embodiment, the output of the circuit comprises a triple redundant switching means for driving the control device, wherein the switching means comprises three switches, each of which is capable alone of switching the control device to a safe condition.

In a preferred embodiment, preferably the electrical signal provided to the sensor is of a substantially low frequency and is of a substantially square wave form. The signal may comprise a clock signal.

In a preferred embodiment, the condition sensed by the sensor in accordance with which the signal is attenuated is the impedance of the sensor.

In a preferred embodiment, the selecting means is arranged to select between a high sensed impedance and a low sensed impedance as the abnormal condition.

The first comparing means may comprise a first comparator. The second comparing means may comprise phase-detection means arranged to compare the phase of the output from the first comparing means with the phase of the signal provided to the sensor.

In a preferred embodiment, the error detection means is arranged in use to detect a high conductivity error condition or a low conductivity error condition at the sensor.

The error detection device may comprise a second comparator.

The output of the circuit may be arranged to drive a relay.

BRIEF DESCRIPTION OF THE DRAWINGS

Preferred embodiments of the present invention will now be described by way of example only with reference to the accompanying diagrammatic drawings in which.

DETAILED DISCUSSION OF PREFERRED EMBODIMENTS

Figure 1:
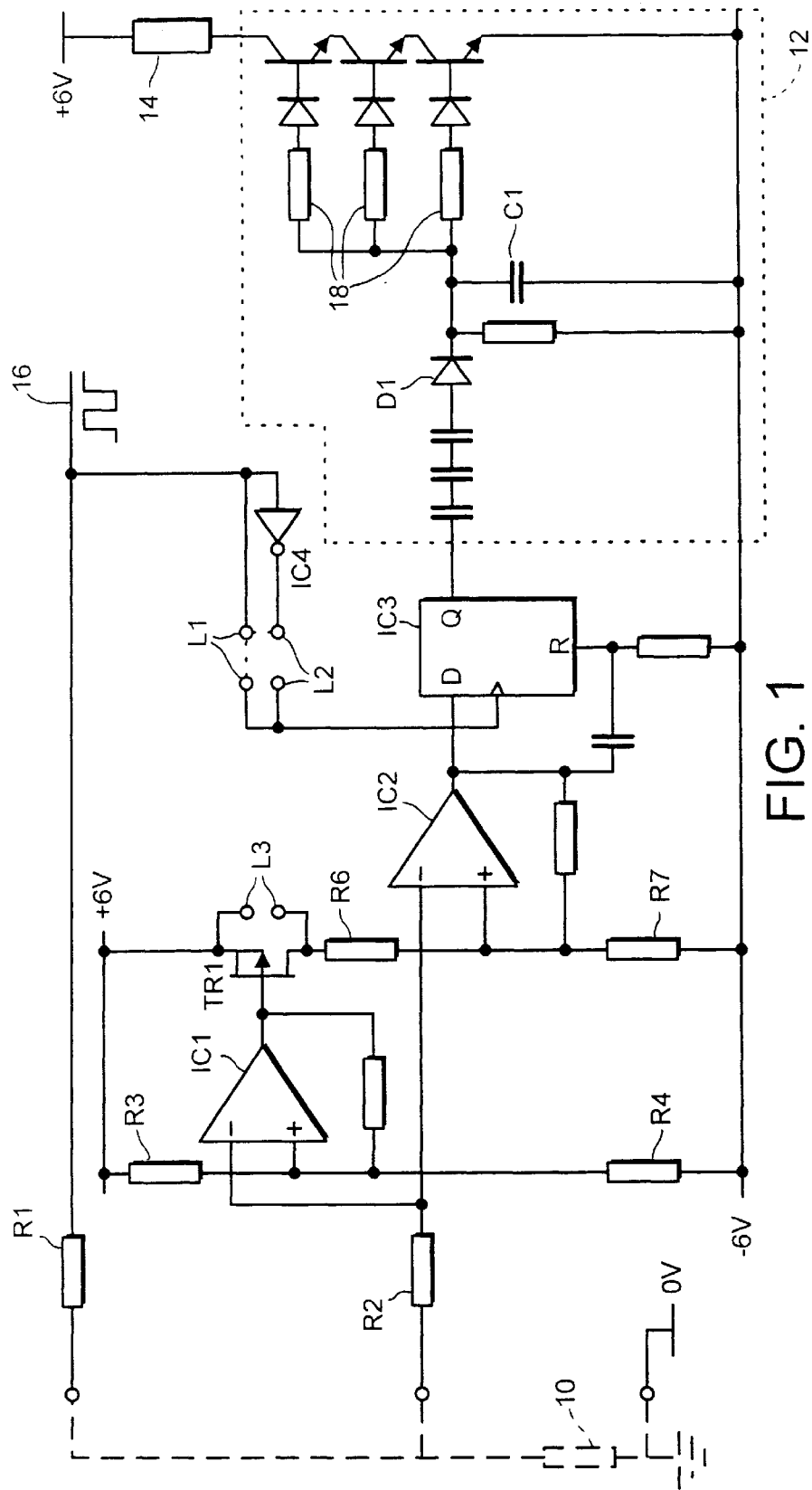
FIG. 1 shows, schematically, an electrical circuit, for use in a fail-safe system according to a first embodiment of the present invention.

Referring to FIG. 1, this shows generally a circuit for controlling a fail-safe operation of measurement and control apparatus (not shown) such as is used in a steam raising plant to monitor the water level in a steam generation vessel. A sensor 10 comprises an electrode which in use is inserted into a water/steam column (not shown) to detect the presence or absence of water. Typical applications of such apparatus include low or high level alarms on steam drums, feed heaters, deareators and turbine water induction prevention systems on steam lines.

The apparatus detects the presence or absence of water by making a measurement of the impedance experienced in a gap between an insulated tip of the electrode and a surface held at a reference voltage or else connected to ground. The impedance measured when water is present is considerably less than that measured when water is absent. The apparatus may be configured to provide an alarm when water is present and should not be, or vice versa.

Broadly, the circuit comprises comparators IC1 and IC2, a phase detector IC3 and a triple-redundant drive circuit 12 which drives a relay 14.

The function of IC1 is to ensure that when operating with water as the normal condition, an electrode fault, such as could be caused by excessive contamination, will cause the system output to indicate an abnormal condition.

The main function of IC2 is to discriminate between the water condition and the steam condition.

The function of IC3 is to ensure that there is no output if there exists an abnormal condition or any fault condition. It follows that there will only be an output if the sensor is in the normal condition. This is then shown to operate a relay using a secure triple redundancy drive circuit so that the relay contacts may be used to indicate a normal or an abnormal/fault condition.

The circuit will now be described in more detail with consideration first being given to the arrangement where the presence of water at the electrode is selected as the normal condition. It follows that it is necessary for the output to indicate an abnormal condition if steam is present or if there is any fault condition. For such an arrangement, the selector links L1 and L3 are open and link L2 is shorted.

The electrode 10 is driven by a low frequency square wave (clock) signal 16 via resistance R1. The electrode forms a potential divider with R1, the amplitude of the signal returned via R2 being dependent upon the resistance of the electrode 10, IC1 is a comparator which acts as an electrode fault detector and which receives at its inverting input, the signal from R2. This is compared to the voltage level at the non-inverting input as formed by the potential divider R3 and R4 such that, if the signal from R2 is less than that at the non-inverting input, the output from IC1 is at a high state. Such a condition results if the wire from the electrode is broken, shorted to ground or if the conductivity is greater than 100 $\mu$S/cm, the threshold level of the comparator IC1, as would be caused by a contaminated or faulty electrode. With no faults present, the output of IC1 is an alternating signal which when applied to the gate of a transistor TR1, switches current through resistors R6 and R7. The resultant signal at the non-inverting input to IC2 is in phase with the clock 16 and has a maximum level as defined by the ratio of R6 and R7. The inverting input of IC2 receives the electrode signal via R2 and this also is in phase with clock 16. The maximum signal level at the non-inverting input to IC2 is set so that, for a water condition, there will be an alternating signal at the output of IC2 which is in phase with the clock 16. When electrode 10 is immersed in steam the signal at the inverting input to IC2 will always be more positive than the signal on the non-inverting input since the impedance of the electrode 10 will be higher. In consequence there will be no alternating output from IC2.

If IC1 should fail in a manner which causes no current to flow through R6 and R7, it places the non-inverting input to IC2 at the negative rail voltage and thus prevents IC2 from outputting a signal. If IC1 should fail in a manner which causes current to flow through R6 and R7, it places the non-inverting input to IC2 at the water/steam threshold voltage. It follows that under water conditions, IC2 will give no output and under steam conditions, an alternating output which is out of phase with the clock 16. If IC2 should fail, its output will go to either a high or low d.c. state. All of the above mentioned output conditions cause IC3 to give no output which is indicative of an abnormal or fault condition.

IC3 is a D Type flip flop circuit with positive edge trigger. It receives the output from IC2 on its D input and the inverted clock signal from inverter IC4 on its clock input. The output from IC2 is also used as the reset signal. Both the D input and the clock input are derived from clock 16, however the switching of the D input is slightly delayed with respect to the clock input due to its passage through the electrode circuit and IC1/IC2. In consequence, it is only when these signals are out of phase that the output of IC3 changes. It is then reset half a cycle later to give an alternating output from IC3. It follows that if the input signals are in phase or if there is no signal on either of these inputs, the output will not be alternating.

The relay drive circuit 12 uses an a.c. detector to drive the relay. The a.c. signal from IC3 will, on its positive cycle, charge the capacitor C1 through D1 and will also switch the transistors 18 to energise the relay 14. During the negative cycle these transistors will remain on due to the stored energy in capacitor C1. The size of C1 is chosen such that, if the a.c. signal ceases, the relay will be de-energised within five clock cycles. The three charging capacitors in series with D1 and the three transistor drive circuits are used to provide triple redundancy to achieve a secure relay drive arrangement. Thus the system indicates a normal condition if water is present and there are no faults and an abnormal condition if steam is present and/or there is a fault.

Consideration is now given to the arrangement where the presence of steam at the electrode is selected as the normal condition. It follows that it is necessary for the output to indicate an abnormal condition if water is present or if there is any fault condition. For such an arrangement, the selector links L1 and L3 are shorted and link L2 is open.

With L3 shorted, IC1 serves no function in the circuit and the non-inverting input to IC2 is set to a d.c. threshold level for the switching from steam to water. Only in the steam condition is the signal from R2, which is applied to the inverting input of IC2, of sufficient value to cause IC2 to output a signal which is antiphase with the clock 16. In all other conditions, which include open or short circuits in the electrode 10, contamination of the electrode or failure of IC2, cause IC2 to go either to a high or a low d.c. state.

The output from IC2, which in the normal steam conditions is a signal in antiphase with clock 16, is applied to IC3 which in this configuration receives its clock signal direct from clock 16 via L1. Since these two signals are antiphase, IC3 outputs an a.c. signal which in turn drives the relay to indicate the normal condition. If the electrode is in water or there is any fault condition the relay outputs an abnormal condition.

Figure 2:
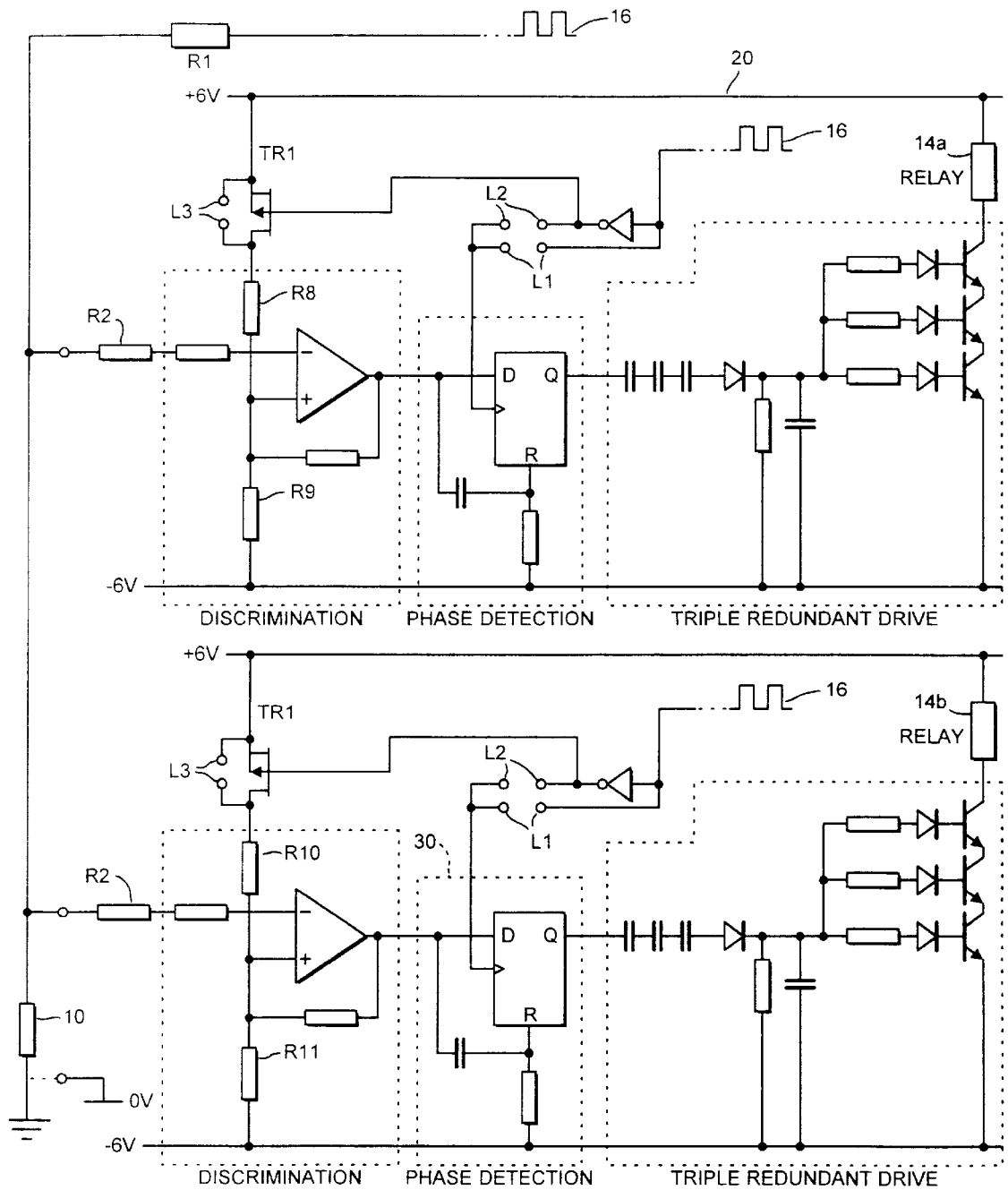
FIG. 2 shows an electrical circuit, for use in a failsafe system according to a second embodiment of the present invention.

In FIG. 2 an alternative arrangement is shown in which the circuit is simplified by the removal of one comparator circuit (i.e. IC1 of the circuit of FIG. 1) and then the resultant circuit is duplicated. In this manner the upper circuit 20 is used primarily to detect the water/steam status and the lower circuit 30 is used primarily to detect an electrode failure condition as results if the electrode is indicating a conductivity of greater than 100 $\mu$S/cm. This difference being defined by selection of the resistive values of R8, R9, R10 and R11. Each circuit will indicate an abnormal condition if there is a component failure within its circuit, but only the upper circuit 20 will indicate an abnormal condition if the water or steam status changes into the abnormal condition. The clock 16 is common to both upper and lower circuits 20, 30. In order to provide a fail-safe condition in the event of any fault or abnormal condition, the contacts (not shown) of the relays 14$a$ and 14$b$, of the upper and lower circuits 20 and 30 respectively, must be connected together.

Although this arrangement uses more components in total, it does provide an operator with the additional information as to whether an abnormal indication is likely to be due to a component failure or to a change from a normal operating condition to an abnormal operating condition, whilst at the same time always providing a fail-safe operation.

What is claimed is:

1. A fail-safe electrical circuit for use with a sensor, said sensor providing an electrical output indicative of a sensed condition, said circuit and said sensor provided with an alternating electrical drive signal, said circuit comprising:

a conductor, connected to said sensor, to provide an attenuated drive signal output, said attenuated output comprising said electrical output indicative of said sensed condition;

a first comparator (IC2) for comparing said attenuated drive signal output with a threshold value signal, said comparator providing an alternating output signal when said attenuated drive signal output corresponds to a sensed normal condition;

a second comparator (IC3) for providing a second comparison output signal when said alternating output signal has a predetermined phase with respect to said alternating electrical drive signal;

a selector to establish normal and abnormal conditions to be sensed, said selector setting the threshold value signal applied to the first comparator and setting the phase of the alternating electrical drive signal which is applied to said second comparator;

a fail-safe output stage, responsive to said second comparator output and having normal and fail-safe states, said stage going to said fail-safe state when said second comparator output fails to indicate said predetermined phase between said alternating drive signal and said alternating output signal; and an error detector (IC1), responsive to the attenuated drive signal output and a preset voltage, for providing an error signal if the attenuated drive signal output is less than a minimum value determined by said preset voltage, said error signal being, in at least one setting of said selector, coupled to said output stage whereby said output stage reverts to its fail-safe state when said error detector detects a short circuit at said conductor.

2. A fail-safe electrical circuit according to claim 1 wherein the output of the circuit is arranged to drive a control device which, has a normal condition and a fail-safe condition such that the condition adopted by the control device is determined by the output of the circuit.

3. A fail-safe electrical circuit according to claim 1 wherein the output of the circuit comprises a triple redundant switching means for driving a control device, wherein the switching means comprises three switches, each of which is capable alone of switching the control device to a safe condition.

4. A fail-safe electrical circuit according to claim 1 wherein the electrical drive electrical signal provided to the sensor is of a substantially low frequency and is of a substantially square wave form.

5. A fail-safe electrical circuit according to claim 1 wherein the signal comprises a clock signal.

6. A fail-safe electrical circuit according to claim 1 wherein the condition sensed by the sensor in accordance with which the signal is attenuated is the impedance of the sensor.

7. A fail-safe electrical circuit according to claim 1 wherein the selector means is arranged to select between a high sensed impedance and a low sensed impedance as the abnormal condition.

8. A fail-safe electrical circuit according to claim 1 wherein the second comparator comprises phase-detection means arranged to compare the phase of the output from the first comparing means with the phase of the signal provided to the sensor.

9. A fail-safe electrical circuit according to claim 1 wherein the error detector is arranged to detect a high conductivity error condition or a low conductivity error condition at the sensor.

10. A fail-safe electrical circuit according to claim 1 wherein the error detector comprises a second comparator.

11. A fail-safe electrical circuit according to claim 1 wherein the output of the circuit is arranged to drive a relay.

12. A fail-safe electrical circuit for use with sensor means for sensing a condition, said sensor means having an electrical characteristic dependent upon said condition, the circuit comprising:

drive means for providing to said sensor means an alternating electrical drive signal;

sensor output signal conductor means for coupling from said sensor means drive signal attenuated in accordance with the condition sensed by said sensor means;

first comparing means coupled to said sensor output signal conductor means to receive the attenuated drive signal and effect a comparison of the attenuated drive signal with a threshold value signal, said first comparing means producing a first comparison output signal representative of a relationship between the amplitude of the attenuated drive signal and the threshold value signal, said first comparison output signal comprising an alternating signal when the attenuated drive signal corresponds to a selected normal condition sensed by said sensor means;

second comparing means coupled to the first comparing means to receive the first comparison output signal and to said drive means to receive said alternating electrical drive signal, said second comparing means comparing the first comparison output signal with the drive signal and producing a second comparison output signal representative of a relationship between the first comparison output signal and the phase of the drive signal;

output stage means having a normal state and a fail-safe state and coupled to said second comparing means to receive said second comparison output signal, said second comparison output signal causing said output stage means to go to said fail-safe state if said first comparison output signal fails to satisfy a predetermined phase relationship with said drive signal;

selecting means to establish normal and abnormal conditions to be sensed, said selector means determining the threshold value signal applied to the first comparing means and setting the phase of the attenuating electrical drive signal which is applied to said second comparing means; and an error detection device coupled to said sensor output signal conductor means to receive the attenuated drive signal and, for at least one selected normal condition, coupled to said output stage means to cause said output stage means to go to the fail-safe state if the error detection device detects a short circuit at the sensor output signal conductor means.

13. A fail-safe circuit according to claim 12 wherein said output stage means includes a control device which has a normal condition and a fail-safe condition such that the condition adopted by said control device is determined by the state of said output stage means.

14. A fail-safe circuit according to claim 13 wherein said output stage means comprises a triple redundant switching means for driving the control device, wherein the switching means comprises three switches, each of which is capable alone of switching the control device to said fail-safe condition.

15. A fail-safe circuit according to claim 12 wherein said drive signal provided to said sensor means is of a substantially low frequency and is of a substantially square wave form.

16. A fail-safe circuit according to claim 15 wherein said drive signal comprises a clock signal.

17. A fail-safe circuit according to claim 12 wherein the electrical characteristic of said sensor means in accordance with which the signal is attenuated is a resistance.

18. A fail-safe circuit according to claim 12 wherein the selecting means is arranged to select between a condition establishing a high sensed impedance and a condition establishing a low sensed impedance as the abnormal condition.

19. A fail-safe circuit according to claim 12 wherein the first comparing means comprises a first comparator.

20. A fail-safe circuit according to claim 12 wherein the error detection device comprises a second comparator coupled to receive a further threshold value signal and to effect a comparison of the attenuated drive signal with the further threshold value signal, said second comparator producing a further comparison output signal representative of a relationship between the amplitude of the attenuated drive signal and the further threshold value signal, said further comparison output signal comprising an alternating signal only when the amplitude of the attenuated drive signal exceeds a value determined by the further threshold value signal.

21. A fail-safe circuit according to claim 12 wherein said output stage means includes at least one relay.

* * * * *